United States Patent [19]

Tabor

[11] 3,710,674

[45] Jan. 16, 1973

[54] EXPANDABLE FASTENER

[75] Inventor: Paul C. Tabor, Clawson, Mich.

[73] Assignee: Meteor Research Limited, Roseville, Mich.

[22] Filed: Dec. 18, 1970

[21] Appl. No.: 99,494

[52] U.S. Cl....................................85/84, 287/100
[51] Int. Cl........B25g 3/38, F16b 13/06, F16c 11/04
[58] Field of Search..........85/84, 85, 7, 8.1, 8.3, 1 P, 85/82, 83; 24/217, 73 S, 208 R; 287/100, 96

[56] References Cited

UNITED STATES PATENTS

| 2,479,075 | 8/1949 | Martin | 85/83 X |
| 1,109,094 | 9/1914 | Weckbaugh | 85/1 P |
| 1,840,928 | 1/1932 | Anthony | 85/84 |
| 2,340,423 | 2/1944 | O'Shaunessy et al. | 85/84 |
| 2,400,142 | 5/1946 | Tinnerman | 85/85 |
| 2,435,847 | 2/1948 | Robertson | 85/84 |

FOREIGN PATENTS OR APPLICATIONS

| 735,572 | 5/1943 | Germany | 85/84 |
| 413,410 | 7/1934 | Great Britain | 1 P/ |

Primary Examiner—Ramon S. Britts
Attorney—Bacon & Thomas

[57] ABSTRACT

A split, conically tapered spring steel sleeve to be inserted through aligned openings in adjacent members. A cylindrical pin is then pushed through the sleeve, which is held against axial movement by a flange at one end thereof, to expand the sleeve to cylindrical shape tightly fitting the openings. Detent means prevent inadvertent removal of the pin and an expendable pilot plug guides the sleeve through misaligned openings.

5 Claims, 8 Drawing Figures

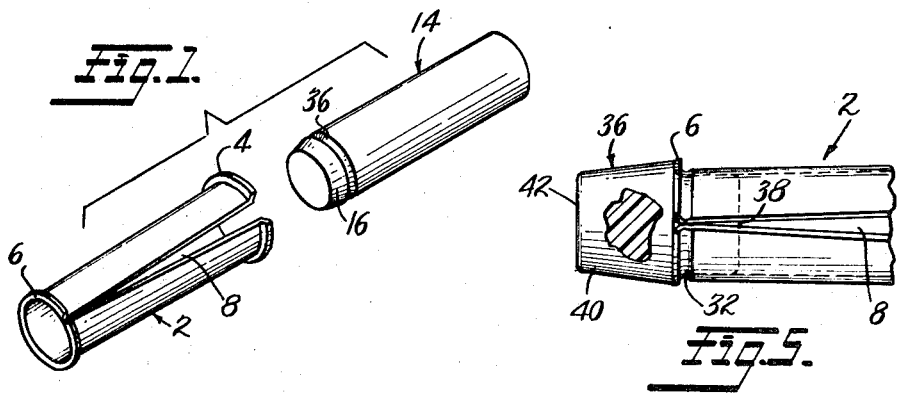
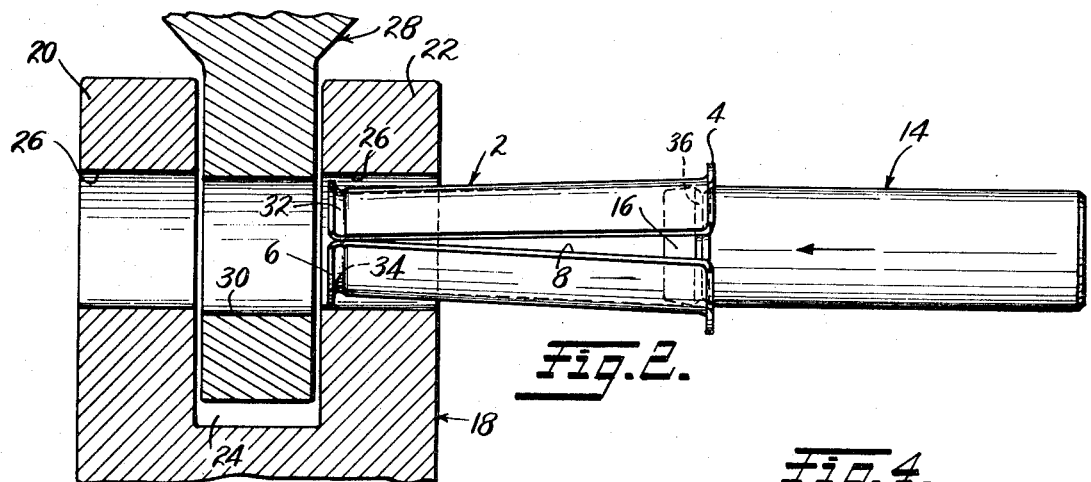
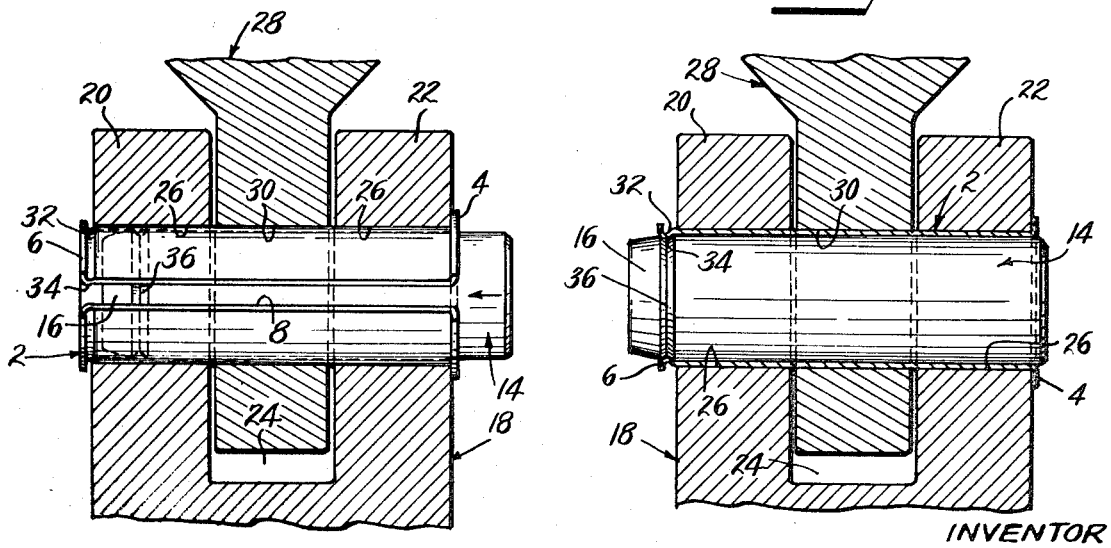
INVENTOR
PAUL C. TABOR
BY Bacon & Thomas
ATTORNEYS

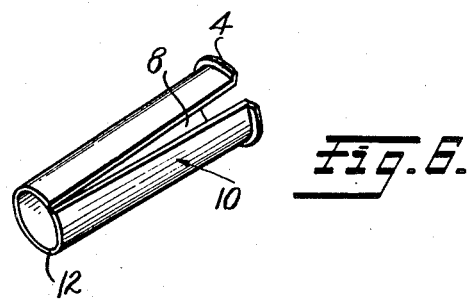
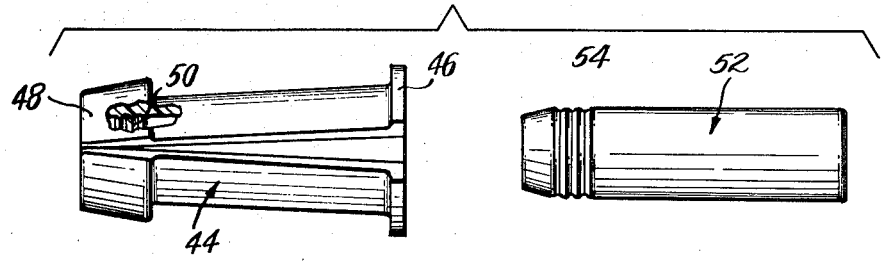
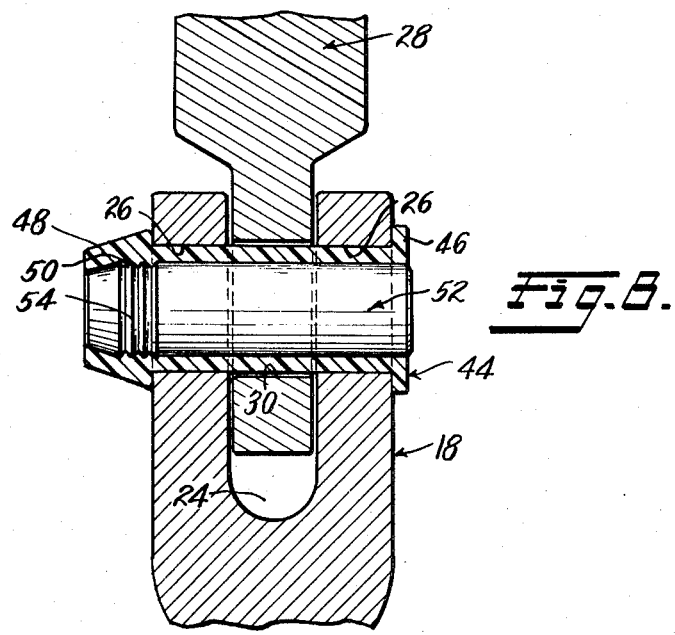

EXPANDABLE FASTENER

BACKGROUND OF THE INVENTION

This invention is in the field of pin-type fasteners to be tightly fitted in aligned openings in workpieces to be held in assembled relationship.

In many instances, it is necessary to provide holding means between workpieces, in the form of a pin or the like, to resist, in shear, relative movement between the parts in a direction tending to shear the pin or the like. It has been customary to provide a pin having tight frictional fit in the aligned openings and to forcibly drive the pin therein, the friction serving to resist withdrawal. It has also been proposed to provide a pin in the form of a helically rolled sheet of metal or a cylindrical split sleeve so that the pin could be somewhat collapsed in a radial direction when driven into the workpieces. Such devices, however, require high driving forces, must slide along the workpieces, and have not proven satisfactory in all instances. As can be realized, maintaining hole alignment of a two-piece assembly while driving such pins therein is very difficult. Furthermore, such prior art devices could not be used successfully where the material of the workpieces was relatively soft or readily deformed and particularly where maintenance of a tight fit was important.

SUMMARY OF THE INVENTION

The present invention comprises in general a normally conically tapered sleeve of resilient metal or the like, the smaller diameter end of which is sufficiently small to freely enter the openings in the workpieces and a generally cylindrical pin to be forced through the sleeve, after the latter is in proper axial position, to radially expand the sleeve into tight frictional fit, thus forcing the openings in the workpieces into proper alignment and tightly bearing against the sides of the openings with sufficient friction to prevent withdrawal and yet the fastener can be set in place without axial sliding movement against the walls of the openings. Preferably, the leading end of the pin is tapered correspondingly to the taper in the relaxed sleeve and cooperating detent means are formed on the sleeve and drive pin to hold the latter in place when the sleeve is fully expanded.

Preferably, at least the large diameter end of the relaxed sleeve is provided with a radial flange adapted to abut a face of the outer workpiece to thereby limit axial movement of the sleeve and further movement of the assembly in an inserting direction results in only the pin moving through the sleeve to expand the same.

BRIEF DESCRIPTION OF THE DRAWINGS

FIG. 1 is an exploded perspective view of a resilient sleeve and expander pin embodying the present invention;

FIG. 2 is an enlarged sectional view through a pair of workpieces to be assembled and the expandable fastener assembly of the invention in an initial position;

FIG. 3 is a view similar to FIG. 2 but showing the fastener assembly in an intermediate position;

FIG. 4 is a view similar to FIG. 3 showing the fastener assembly in its final position;

FIG. 5 is a fragmentary view of an end portion of the invention showing an accessory therefor;

FIG. 6 is a perspective view of a modified form of the invention; and

FIGS. 7 and 8 are similar to FIGS. 1 and 4 but illustrate a further modification.

DESCRIPTION OF THE PREFERRED EMBODIMENTS

FIG. 1 shows a preferred embodiment of the invention comprising a conically tapered split sleeve 2, preferably formed of spring steel and provided with short radial flanges 4 and 6 at its large diameter and small diameter ends, respectively. For reasons of economy and ease of manufacture, the sheet metal from which the sleeve 2 is formed is preferably of rectangular configuration and when rolled or otherwise formed to the tapered conical shape shown, the longitudinal split 8 between the ends thereof is wider at the larger end of the sleeve than it is at the smaller end. However, the invention contemplates such a sleeve wherein the split 8 may be of uniform width when the sleeve is in its relaxed conical shape. FIG. 6 shows a modified form of the sleeve, bearing reference numeral 10, and wherein the smaller diameter end 12 of the sleeve is plain, that is, no flange 6 is formed thereon.

A generally cylindrical solid pin 14 forms the other portion of the assembly. The cylindrical portion of the pin 14 is preferably at least as long in the axial direction as the corresponding length of the sleeve 2 and the forward end of pin 14 is provided with a short tapered portion 16, tapered to an angle substantially the same as the cone angle of the relaxed sleeve 2, as is evident from FIG. 2.

In FIG. 2, numeral 18 designates a workpiece in the form of a clevis structure, by way of example only, having spaced legs 20 and 22 and a space 24 therebetween. The legs 20 and 22 are provided with aligned cylindrical openings 26. The member 28 may be any second workpiece, such as a fixture on the end of a rod to be assembled to the clevis 18. The member 28 is likewise provided with a cylindrical opening 30 adapted to be brought into axial alignment with the openings 26. The openings 26 and 30 are preferably of a diameter substantially equal to the large diameter of the tapered sleeve 2 adjacent the flange 4 thereon. However, that diameter of the sleeve 2 may be slightly larger than the openings 26 so that it must be lightly forced therein. With the parts to be assembled being in the general relationship shown in FIG. 2, the pin 14 is placed in the large end of the tapered sleeve 2 with its tapered end portion 16 engaging the inner surface of the tapered sleeve 2 and the assembly can thus be handled as a unit. The assembly is then inserted into the nearest opening 26 and, as shown, the outer diameter of the flange 6 is less than the diameter of the opening 26 so that it freely enters the same without interference. The assembly is then moved through the substantially aligned openings 26 and 30 to about the position of FIG. 3 wherein flange 4 abuts the outer surface of clevis leg 22. Thereafter the pin 14 may be forced to the left by any suitable means to slide within the sleeve 2 and radially expand the same into tight surface engagement with the walls of the openings 26 and 30, as shown in FIG. 3.

As shown in the drawings, the end of the tapered sleeve 2 adjacent the flange 6 is provided with a shallow groove 32 by deforming the metal of the sleeve inwardly to also form an inner circumferential bead 34 projecting inwardly a very short distance. The leading end of the pin 14 is provided with a shallow groove 36 extending therearound and when the pin 14 is forced completely into the sleeve 2, as shown in FIG. 4, the bead 34 on sleeve 2 enters and snaps into the groove 36 on pin 14 to thus securely hold the assembly in place against inadvertent withdrawal of the pin and/or movement thereof as a result of vibration or other forces on the assembly.

The flange 6 on the normally smaller end of the sleeve 2 also serves to prevent withdrawal of the assembly from the openings 26 and 30 since, when the sleeve is expanded as shown, the flange 6 serves as a retainer to prevent withdrawal of the assembly toward the right, as shown in the figures. However, in many instances, the flange 6 and even the bead 34 and groove 36 may be omitted and the sleeve may take the simpler form illustrated in FIG. 6.

While the assembly illustrated in FIG. 2 may be inserted in openings in the members 18 and 28 even though those openings are slightly misaligned, in some instances the misalignment may be sufficiently great to render it difficult to insert the assembly in the workpieces without at least some substantial prealignment of the openings. FIG. 5 illustrates an accessory adapted for use with the expandable fastener of this invention, which accessory comprises an expendable plug member 36 having a shank portion 38 adapted to frictionally enter and be frictionally held by the smaller diameter end of the sleeve 2. A head portion 40 on the plug 36 is conically tapered from a large diameter substantially equal to that of the flange 6 to a relatively smaller diameter at its forward end 42. The diameter of the forward end 42 is thus considerably smaller than that of the flange 6 and the plug 36 can serve to bring the workpieces 18 and 28 into substantial alignment whereby the flange 6 can readily enter even a substantially misaligned opening of member 28. When the assembly is in position and the pin 14 is forced to a position approaching that shown in FIG. 3, the smaller end of the sleeve will have expanded sufficiently to release the plug 36 and the same is merely pushed out of the assembly by the further movement of the pin 14. Preferably, the plug 36 will be made of plastic or other very inexpensive material and is considered expendable.

While the description has proceeded on the assumption that the sleeve 2 is expanded to tightly frictionally engage the walls of the openings 26 and the opening 30, it is apparent that the opening 30 may be slightly larger whereby, upon complete installation of the fastener, the member 28 may be capable of pivotal movement around the fastener assembly. In any event, the installed fastener serves to resist separation of the members 18 and 28 in a direction that would apply shearing forces to the fastener and it has been found that the assembly described has shear strength at least equal to a solid pin and in most instances has greater strength unless the solid pin is formed of expensive hard material.

As suggested, the sleeve 2 is preferably formed of spring steel to normally assume the conically tapered shape described. Thus, when it is desired to disassemble member 28 from member 18, the pin 14 may be pushed from the assembly in a direction reverse to that described, whereupon the sleeve will contract to the tapered form shown in FIGS. 1 and 2 and can be readily withdrawn from the openings. The flange 6 will prevent substantial movement of the sleeve 2 in the openings 26 when the pin 14 is thus being withdrawn. In the form of FIG. 6, the pin may be removed from the assembly by forcing it in the same direction as when it was inserted for installation of the fastener. Clearly, the expandable fastener may be installed and later removed for whatever purpose and can be reused since no damage or marring thereof was occasioned by its initial installation and/or removal.

From the foregoing description, it is apparent that applicant has provided an expandable fastener for efficient assembly of workpieces even though the hole diameters therein might be sufficiently off tolerance to prevent tight assembly of a solid drive pin. Alignment of the intended assembled components need not be precise since the fastener itself forces them into proper alignment upon installation. The forces necessary to insert and expand the fastener are of much lesser magnitude than those necessary to drive a solid pin to a tight fit and are less than those necessary to install the split or spiral drive pins referred to earlier. This reduced assembly load minimizes damage to the components being assembled and is particularly valuable where such components cannot sustain impact forces, such, for example, as components made of diecast aluminum, zinc or the like.

In the modification illustrated in FIGS. 7 and 8, parts substantially identical to those shown in FIGS. 2–4 bear the same reference numerals. As suggested previously herein, in some instances it may be desirable that members 28 and 18 be relatively rotatable about the axis of the fastener and it was suggested that the opening in one or the other of the members be made slightly oversized. In FIGS. 7 and 8, the relaxed tapered sleeve 44 is constructed of a suitable anti-friction plastic material, such as the materials known as Teflon or Nylon, each of which has low friction characteristics but each of which is sufficiently rigid and resilient to function as the split sleeve of the present invention. As shown, the tubular sleeve 44 is provided with a flange 46 at its large diameter end serving the same purpose as the flange 4 of FIGS. 1 through 4. At its small diameter end the sleeve is formed with an integral pilot portion 48 serving the functions of both the pilot plug 40 of FIG. 5 and the flange 6 of FIG. 1. In addition, the inner surface of the split tapered sleeve 44 is provided with circumferential ribs or indentations 50 inwardly of the pilot portion 48 and a generally cylindrical pin 52 is provided with a series of circumferential grooves 54 in position to engage and substantially mate with the projections 50 when the pin 52 is forced through the sleeve 44, all as indicated in FIG. 8. Obviously, the modification shown in these Figures may be installed and/or removed in exactly the manner earlier described with reference to previous Figures and not only serves to hold the parts in assembled relation but further functions as an anti-friction bearing material to promote or facilitate relative rotation between the parts 18 and 28.

While a limited number of specific embodiments have been shown and described herein, the same are merely illustrative of the principles of the invention and other forms may be resorted to.

I claim:

1. A pivot pin device for a clevis assembly comprising:
   a generally conically tapered resilient sleeve having only a single split therein and extending longitudinally thereof from end to end the remainder thereof being imperforate, the sides of which are spaced apart at the large diameter end and which converge uniformly toward each other throughout the length of the taper and in a direction toward the small diameter end; and
   a solid cylindrical pin of a diameter not less than the internal diameter of the large end of said sleeve, the inner surface of said tapered portion of said sleeve being without protuberances, the portion of said pin which is adapted to engage said tapered portion having a substantially constant diameter, whereby said pin may be forced into said sleeve to expand the same to cylindrical shape with said sleeve frictionally gripping said pin throughout its length, said sleeve being of spring steel whereby it will return to said generally conically tapered shape upon removal of said pin therefrom, said sleeve being provided with an outwardly extending peripheral flange at each end thereof, the flange at the small diameter end of said sleeve having an outer diameter no greater than the outer diameter of the other end of said tapered sleeve but greater than the diameter of the small end of the generally conical surface of the tapered sleeve.

2. A fastener as defined in claim 1 wherein said pin is provided with a tapered axial extension at one end thereof, tapering from the outer periphery of said pin at substantially the same angle as the taper of said sleeve whereby said pin may be frictionally held to said sleeve, prior to expansion of said sleeve, to facilitate handling said fastener as a unit.

3. A fastener as defined in claim 1 wherein the small end of said sleeve is provided with a short inwardly extending projection and wherein said pin is provided with a shallow indentation adjacent the leading end thereof and registrable with said projection whereby said projection enters said indentation when said sleeve is fully expanded to resist axial movement of said pin relative to said sleeve.

4. A fastener as defined in claim 3 wherein said projection is a peripheral bead and said indentation is a peripheral groove.

5. A fastener as defined in claim 1 including a pilot member frictionally and removably positioned in only the small end of said sleeve and tapering axially outwardly therefrom to align openings in members to be joined sufficiently for the small end of said sleeve to pass therethrough.

* * * * *